US012591088B2

(12) United States Patent
Lee et al.

(10) Patent No.: US 12,591,088 B2
(45) Date of Patent: Mar. 31, 2026

(54) BACKLIGHT MODULE AND NAKED-EYE STEREOSCOPIC DISPLAY DEVICE

(71) Applicant: DARWIN PRECISIONS CORPORATION, Hsinchu County (TW)

(72) Inventors: Ya-Ching Lee, Hsinchu County (TW); Hsiang-I Hu, Hsinchu County (TW); Yu-Huan Chiu, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 19/023,494

(22) Filed: Jan. 16, 2025

(65) Prior Publication Data

US 2025/0347840 A1 Nov. 13, 2025

(30) Foreign Application Priority Data

May 7, 2024 (TW) ................................. 113116902

(51) Int. Cl.
| | |
|---|---|
| *F21V 8/00* | (2006.01) |
| *G02B 30/33* | (2020.01) |
| *H04N 13/302* | (2018.01) |
| *H04N 13/346* | (2018.01) |

(52) U.S. Cl.
CPC ......... *G02B 6/0053* (2013.01); *G02B 6/0076* (2013.01); *G02B 30/33* (2020.01); *H04N 13/302* (2018.05); *H04N 13/346* (2018.05)

(58) Field of Classification Search
CPC .................................................... G02B 6/0076
See application file for complete search history.

(56) References Cited

U.S. PATENT DOCUMENTS

| | | | |
|---|---|---|---|
| 8,842,237 B2 | 9/2014 | Chen | |
| 12,158,641 B2 * | 12/2024 | Zhu ................... | G02F 1/133627 |
| 2006/0164862 A1 * | 7/2006 | Chien ................. | G02B 6/0038 |
| | | | 362/619 |
| 2013/0003176 A1 * | 1/2013 | Yang ...................... | H04N 13/32 |
| | | | 359/464 |

(Continued)

FOREIGN PATENT DOCUMENTS

| | | |
|---|---|---|
| CN | 100410767 C | 8/2008 |
| CN | 102822708 A | 12/2012 |

(Continued)

*Primary Examiner* — Eric T Eide

(57) ABSTRACT

The present invention provides a backlight module, including a light guide plate assembly, a reverse prism sheet, and a first and a second light source modules. The light guide plate assembly includes a first and an upper second light guides. The light guide plates respectively have a light incident and a light exiting surfaces, and a bottom surface with a plurality of light guide structures formed thereon. The light exiting and bottom surfaces are located on opposite sides of the light guide plate, and respectively connected to the light incident surface. The two light incident surfaces are respectively located on opposite sides of the light guide plate assembly. The reverse prism sheet is disposed on the second light guide plate with prismatic structures facing the same. The light source modules are respectively disposed aside the two incident surfaces, and are adapted to be activated alternatively at a frequency.

7 Claims, 8 Drawing Sheets

(56)     References Cited

U.S. PATENT DOCUMENTS

| | | | | |
|---|---|---|---|---|
| 2013/0286679 | A1 * | 10/2013 | Chen | G02B 6/0051 |
| | | | | 362/625 |
| 2017/0010407 | A1 * | 1/2017 | Huang | G02B 6/0068 |
| 2017/0261672 | A1 * | 9/2017 | Liu | G02B 6/0068 |
| 2023/0288753 | A1 * | 9/2023 | Shiau | G02F 1/133615 |

FOREIGN PATENT DOCUMENTS

| | | |
|---|---|---|
| CN | 106896512 A | 6/2017 |
| TW | I504988 B | 10/2015 |
| TW | I564591 B | 1/2017 |
| TW | I575254 B | 3/2017 |

* cited by examiner

100

BACKLIGHT MODULE AND NAKED-EYE STEREOSCOPIC DISPLAY DEVICE

FIELD OF THE INVENTION

The present invention relates to a backlight module, and in particular to a backlight module for a stereoscopic display device.

BACKGROUND OF THE INVENTION

Today in the field of stereoscopic display technology, glasses-based and naked-eye stereoscopic display technologies are included. Known naked-eye stereoscopic display technologies include such as the use of lens splitting or slit-type gratings to allow the left and right eyes to receive different images, and the use of rotating mirrors to change the angle of light, so that images of different angles enter the left and right eyes separately to generate stereoscopic vision. However, the cost of lenses is high, and there is the problem of difficulty in improving image resolution, which affects the image quality. Slit-type gratings may block some light, causing brightness reduction, and therefore, the power of the backlight module needs to be increased so that the costs are difficult to reduce.

SUMMARY OF THE INVENTION

The present invention provides a backlight module that avoids energy consumption issues, helps reduce costs, improves light output, and enhances image brightness and resolution.

The present invention further provides a naked-eye stereoscopic display device that avoids poor resolution and can have better image brightness and resolution.

The backlight module provided by the present invention includes a light guide plate assembly, a reverse prism sheet, and a first and a second light source modules. The light guide plate assembly includes a first light guide and a second light guide. The first light guide plate has a first light incident surface, a first light exiting surface, a first bottom surface, and a plurality of first light guide structures. The first light exiting surface and the first bottom surface are located on opposite sides of the first light guide plate, and respectively connected to the first light incident surface. The plurality of first light guide structures are formed on the first bottom surface. The second light guide plate is disposed on the first light guide plate, and has a second light incident surface, a second light exiting surface, a second bottom surface, and a plurality of second light guide structures. The second light exiting surface and the second bottom surface are located on opposite sides of the second light guide plate and respectively connected to the second light incident surface, and the second bottom surface faces the first light exiting surface of the first light guide plate. The plurality of second light guide structure are formed on the second bottom surface. The reverse prism sheet is disposed on the second light guide plate, and includes a substrate and a plurality of prismatic structures. The plurality of prismatic structures are disposed on the substrate and face the second light exiting surface of the second light guide plate. The light guide plate assembly has a first side and a second side opposite to the first side, and the first light incident surface of the first light guide plate is located on the first side, the second incident surface of the second light guide plate is located on the second side, and the first light source module is disposed aside the first incident surface, the second light source module is disposed aside the second incident surface. The first and second light source modules are adapted to be activated alternatively at a frequency.

The present invention further provides a naked-eye stereoscopic display device, including the above-described backlight module and a display panel. The display panel is disposed on the backlight module.

Because the use of the light guide plate assembly and the first and second light source modules in this invention, and the first and second light source modules can be alternately activated from the opposite sides and then provide directional light emission alternately through the first and second light guide plates, it ensures the light output energy and the brightness of the image on the display device. Additionally, images from different viewing angles can enter the left and right eyes separately, resulting in a stereoscopic visual effect.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

The foregoing and other technical contents and other features and advantages of the present invention will be clearly presented from the following detailed description of a preferred embodiment in cooperation with the accompanying drawings. Directional terms mentioned in the following examples, for example, upper, lower, left, right, front, back, top or bottom, are only used to describe directions referring to the attached drawings. Therefore, the directional terms used are for illustration and not for limitation. In addition, terms such as "first" and "second" involved in the description or claims are merely used for naming the elements or distinguishing different embodiments or ranges rather than limiting the upper limit or lower limit of the quantity of the elements.

Figure 1:
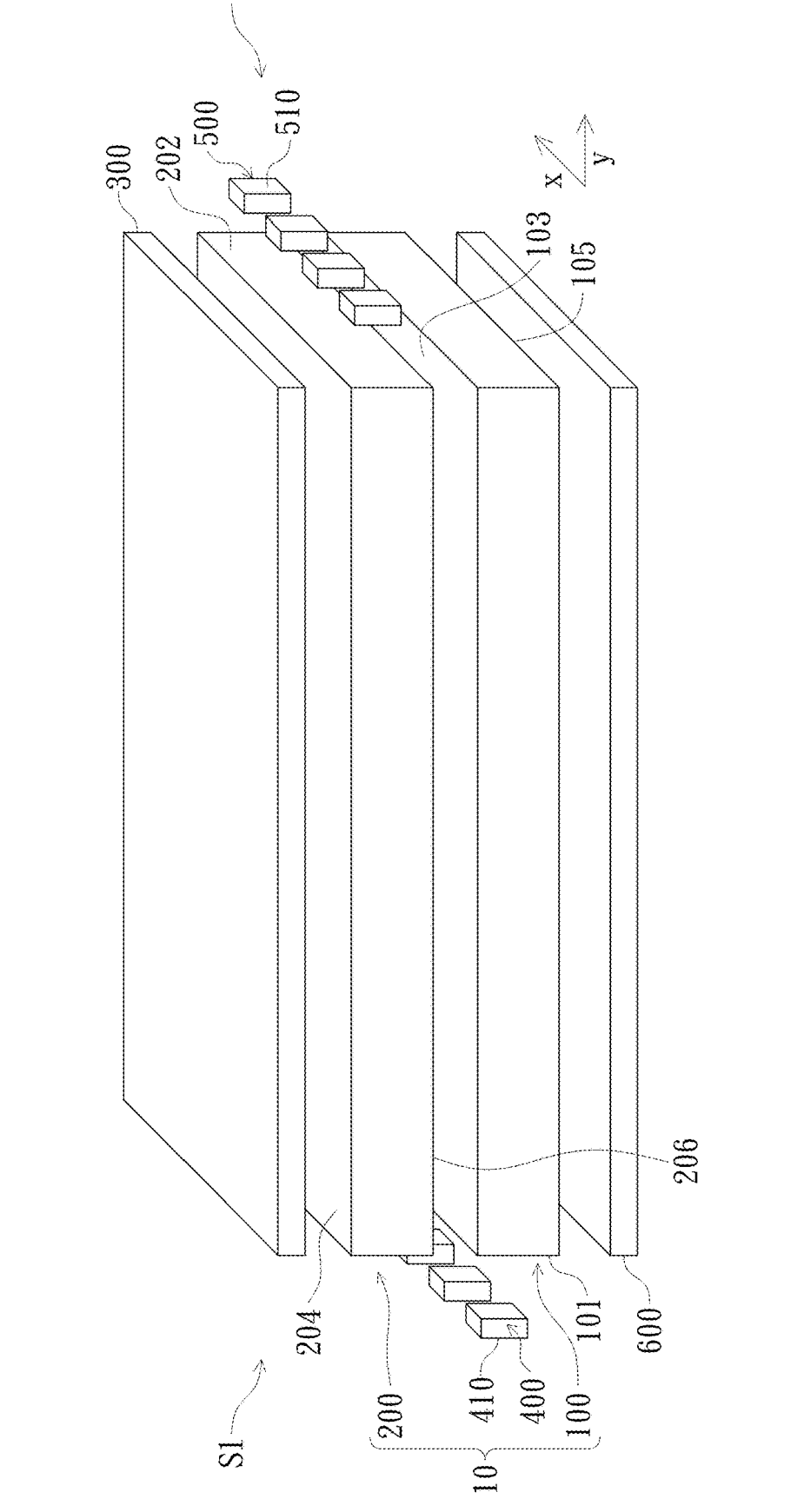
FIG. 1 is a three-dimensional schematic view of a backlight module accordingly to an embodiment of the present invention.

FIG. 1 is a three-dimensional schematic diagram of a backlight module according to an embodiment of the present invention. As shown in FIG. 1, in the embodiment of the present invention, the backlight module 1 includes a light guide plate assembly 10, a reverse prism sheet 300, a first light source module 400, and a second light source module 500. The first light source module 400 and the second light source module 500 are respectively disposed on two opposite sides (that is, the first side S1 and the second side S2) of the light guide plate assembly 10. The first side S1 and the second side S2 can be the left and right sides respectively, but not limited thereto. For example, depending on the position of the viewer, the first side S1 may not necessarily be on the left, and the second side S2 may not necessarily be on the right. The reverse prism sheet 300 is disposed on the upper side of the light guide plate assembly 10. The reverse prism sheet 300 is substantially parallel to the light guide plate assembly 10.

In the embodiment of the present invention, the light guide plate set 10 includes two light guide plates: a first light guide plate 100 and a second light guide plate 200. The first light guide plate 100 has a first light incident surface 101, a first light exiting surface 103, and a first bottom surface 105. The first light exiting surface 103 and the first bottom surface 105 are respectively located on opposite sides of the first light guide plate 100 and connected to the first light incident surface 101. The first light guide plate 100 also has a plurality of light guide structures 150 (that is, the first light guide structures 150 and described later). The first light guide structure 150 is formed on the first bottom surface 105 and for changing the direction of light ray traveling in the first light guide plate 100 so the light ray can leave the first light guide plate 100 at a specific angle from the first light exiting surface 103. The second light guide plate 200 is disposed on the first light guide plate 100 and has a second light incident surface 202, a second light exiting surface 204, and a second bottom surface 206. The second light exiting surface 204 and the second bottom surface 206 are respectively located on two opposite sides of the second light guide plate 200 and connected to the second light incident surface 202, and the second bottom surface 206 faces the first light exiting surface 103 of the first light guide plate 100. The second light guide plate 200 also has a plurality of light guide structures 250 (that is, the second light guide structures 250 and described later). The second light guide structure 250 is disposed on the second bottom surface 206 and for changing the direction of light ray traveling in the second light guide plate 200 so the light ray can leave the second light guide plate 200 at a specific angle from the second light exiting surface 204.

In the preferred embodiment of the present invention, the first light incident surface 101 and the second light incident surface 202 are respectively located on opposite sides (i.e., the first side S1 and the second side S2) of the light guide plate assembly 10. The first light source module 400 and the second light source module 500 are further respectively disposed aside the first light incident surface 101 and the second light incident surface 202. The first light source module 400 and the second light source module 500 can respectively include a plurality of light-emitting elements 410 and 510. The light-emitting element can be, for example, a light-emitting diode, and has a light-emitting surface facing the first light incident surface 101 or the second light incident surface 202. When the first light source module 400 is turned on or activated, a first light ray L1 from the light-emitting element 410 enters the first light guide plate 100 from the first light incident surface 101, is guided to the first light exiting surface 103 by the first light guide structures 150, enters the second light guide plate 200, passes through the second light guide plate 200, enters the reverse prism sheet 300, and then exits. Similarly, when the second light source module 500 is activated or turned on, a second light ray L2 from the light-emitting element 510 passes through the second light guide plate 200 and the reverse prism sheet 300 and then exits. In addition, in the embodiment of the present invention, the backlight module 1 may further include other optical films, such as a reflective sheet 600 shown in FIG. 1 as an example. The reflective sheet 600 can be disposed, for example, at the bottom of the light guide plate assembly 10 and for reflecting the light ray to enter the light guide plate assembly 10.

Figure 2:
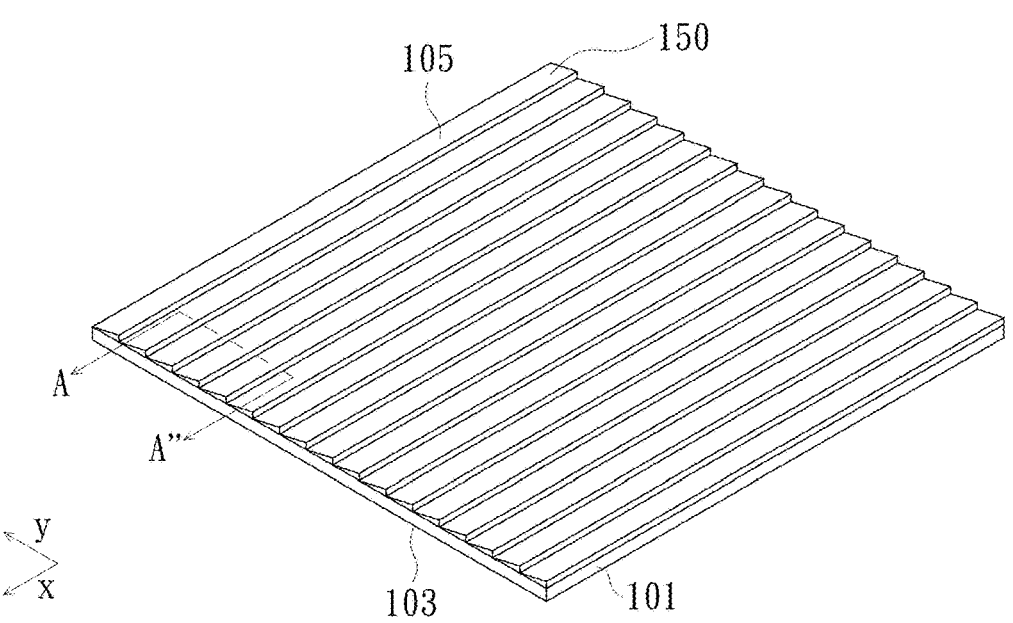
FIG. 2 is a three-dimensional schematic view of a light guide plate accordingly to an embodiment of the present invention.
Figure 3:
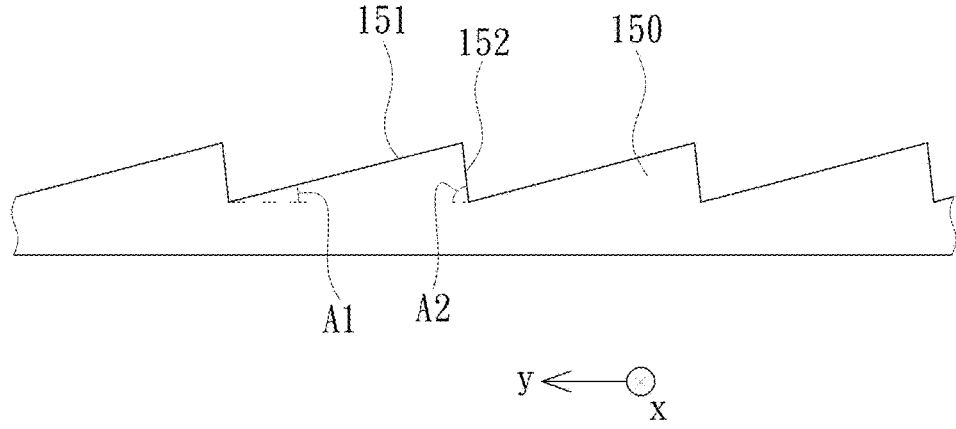
FIG. 3 is a schematic cross-sectional view of the light guide plate taken along the line A-A" in FIG. 2.

FIGS. 2 and 3 respectively show a three-dimensional schematic view and a cross-sectional schematic view of a light guide plate according to an embodiment of the present invention, in which FIG. 2 is shown with a perspective with the bottom surface 105 facing upward. As shown in FIGS. 2 and 3, each light guide structure 150 extends along a first direction x, the first direction x is preferably substantially parallel to an extension direction of the light incident surface 101, and the plurality of light guide structures 150 can be arranged in a second direction y perpendicular to the first direction x. In some embodiments of the present invention, the light guide plate 100 can serve as the first light guide plate 100.

As shown in FIGS. 2 and 3, each first light guide structure 150 further has a first bevel 151 and a second bevel 152. The first light guide structure 150 can be, for example, a V-shaped groove (V-cut), and the two adjacent inner surfaces of the groove are respectively the first bevel 151 and the second bevel 152. Alternatively, the first light guide structure 150 can be a prism-like body, and the two adjacent surfaces of the prism-like body are respectively the first bevel 151 and the second bevel 152. The first light guide structure 150 is not limited to the V-shaped groove and the prism-like body. The first bevel 151 is located on the side of the first light guide structure 150 facing away from the first light incident surface 101, and forms a first included angle A1 with respect to the first bottom surface 105, or forms the first included angle A1 with respect to a plane that is substantially parallel to the first bottom surface 105. The first included angle A1 is preferably less than or equal to 6°, for example, $1° \leq$ the first included angle A1 $\leq 6°$, and can be such as 1°, 1.5°, 2°, 2.5°, 3°, 3.5°, 4°, 4.5°, 5°, 5.5°, and 6°. The second bevel 152 is located on the side of the first light guide structure 150 facing the first light incident surface 101, and can form a second included angle A2 with respect to the first bottom surface 105, or form the second angle A2 with respect to the plane that is substantially parallel to the first bottom surface 105. The second included angle A2 is an acute angle greater than the first included angle A1, for example: $60° \leq$ the second included angle A2 $< 90°$, and can be such as 60°, 65°, 70°, 75°, 80°, 85°, and 90°, and is preferably $70° \leq$ the second included angle A2 $< 80°$, but not limited thereto. When the light guide plate serves as the first light guide plate 100 and is disposed in the backlight module 1, the first light source module 400 is disposed aside the first light incident surface 101, the first bevel 151 faces away from the first light source module 400, and the first included angle A1 is far away from the first light source module 400. By means of the first bevel 151 and its first included angle A1 and the second bevel 152 and its second included angle A2, the first light guide plate 100 can preferably make the first light ray L1 be emitted at the specific angle, pass through the reverse prism sheet 300, and then exit at a preset angle in a preset direction.

Figure 4:
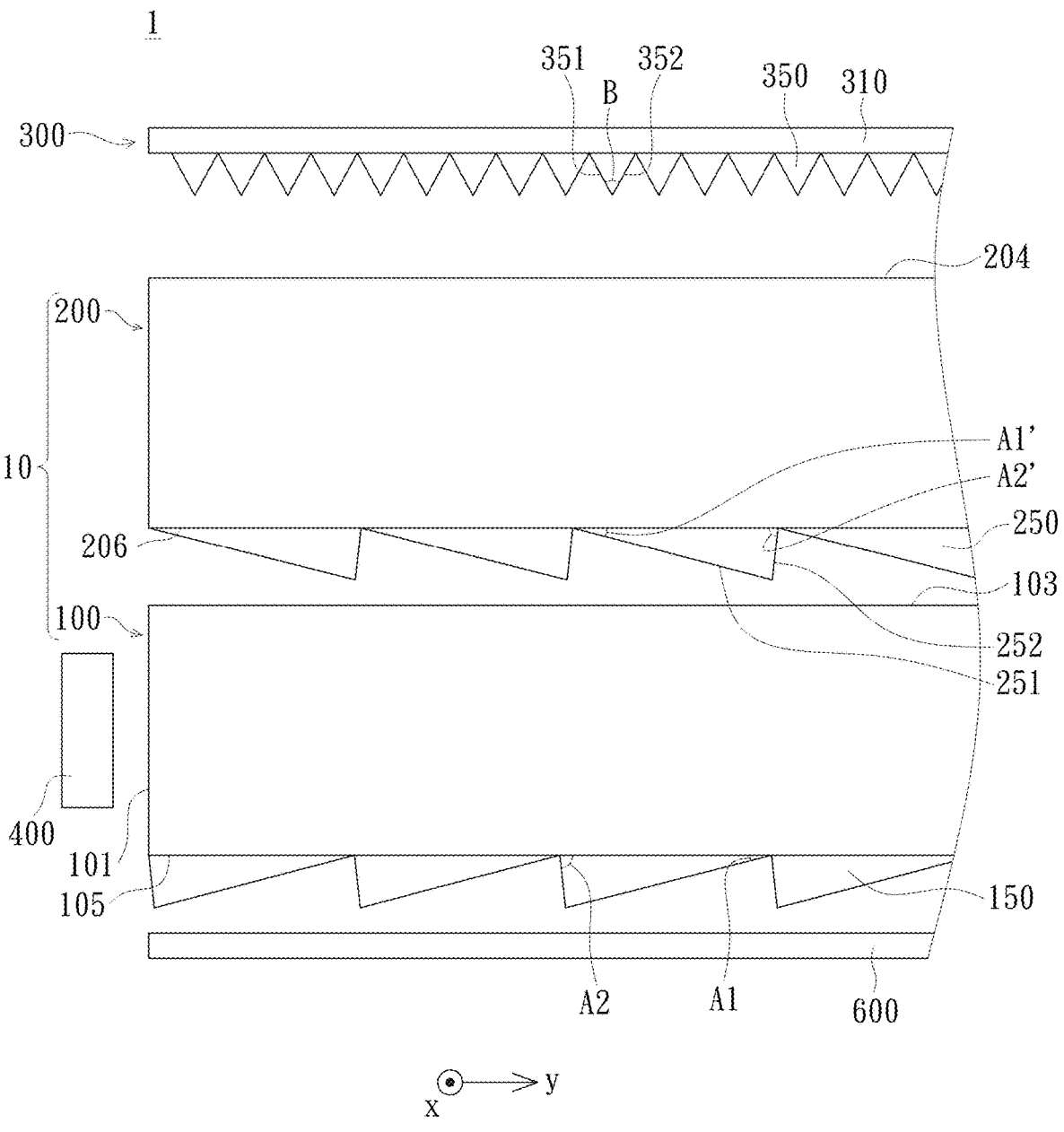
FIG. 4 is a schematic partially enlarged side view according to the embodiment in FIG. 1.

In the embodiment of the present invention, the second light guide plate 200 can have the same or similar structure as shown in FIGS. 2 and 3. The structure of the second light guide plate 200 is further described as follows with reference to FIG. 4. As shown in FIG. 4, each second light guide structure 250 also has a first bevel 251 and a second bevel 252, and the first bevel 251 and the second bevel 252 are respectively located on the sides of the second light guide structure 250 facing away and facing toward the second light incident surface 202. The first bevel 251 forms a first included angle A1' with respect to the second bottom surface 206, and the second bevel 252 forms a second included angle A2' with respect to the second bottom surface 206. The specification of the first included angle A1' can refer to the aforementioned first included angle A1, and the specification of the second included angle A2' can refer to the aforementioned second included angle A2. However, it is understood that the value of A1 can be different from the value of A1', and the value of A2 can be different from the value of A2'. As shown in FIG. 1, the second light source module 500 is disposed aside the second light incident surface 202 when the second light guide plate 200 is disposed in the backlight module 1, wherein the first bevel 251 faces away from the second light source module 500, and the first included angle A1' is away from the second light source module 500. The second light guide plate 200 preferably allows the second light ray L2 to be emitted at the specific angle and exit at a preset angle in a preset direction after passing through the reverse prism sheet 300.

In summary, both the first light guide plate 100 and the second light guide plate 200 are disposed with their gentler inclined surfaces facing away from the light source module. The so-called gentler inclined surface forms the first bevel 151 of the first angle A1 on the first light guide structure 150 and forms the first bevel 251 of the first angle A1' on the second light guide structure 250. Because the first light source module 400 and the second light source module 500 are respectively located on the first side S1 and the second side S2 opposite to each other, the first bevel 151 of the first light guide plate 100 and the first bevel 251 of the second light guide plate 200 in the backlight module 1 are oriented in the opposite directions. In some embodiments of the present invention, the light guide plate assembly 10 can include two identical light guide plates. In this case, the two identical light guide plates are disposed with the light guide structure facing downward and reversely with respect to each other, where the lower light guide plate can serve as the first light guide plate 100, the upper light guide plate serves as the second light guide plate 200, the value of A1 and the value of A1' are the same, and the value of A2 and the value of A2' are the same. Alternatively, in some embodiments, the value of A1 and the value of A1' are different. As described above, the first light ray L1 and the second light ray L2 are respectively emitted at the specific angle(s) and exit at the preset angle(s) in the preset directions after passing through the reverse prism sheet 300. At this time, it is preferable for the preset directions of the two exiting light rays to be opposite to each other and the preset angle(s) to be the same. By designing the first angles A1 and A1', the same angles of the exiting light rays can be achieved.

As shown in FIGS. 1 and 4, the reverse prism sheet 300 on the light guide plate assembly 10 includes a substrate 310 and a plurality of prismatic structures 350, and the reverse prism sheet 300 is disposed on the second light guide plate 200. The plurality of prismatic structures 350 on the substrate 310 faces towards the second light exiting surface 204 of the second light guide plate 200. Each prismatic structure 350 preferably extends along the first direction x, and the plurality of prismatic structures 350 can be arranged along the second direction y perpendicular to the first direction x. The first light ray L1 and the second light ray L2 emitted from either the first light guide plate 100 or the second light guide plate 200 can be adjusted by the reverse prism sheet 300 to further exit at the specific angle(s) in the specific directions.

Figure 5:
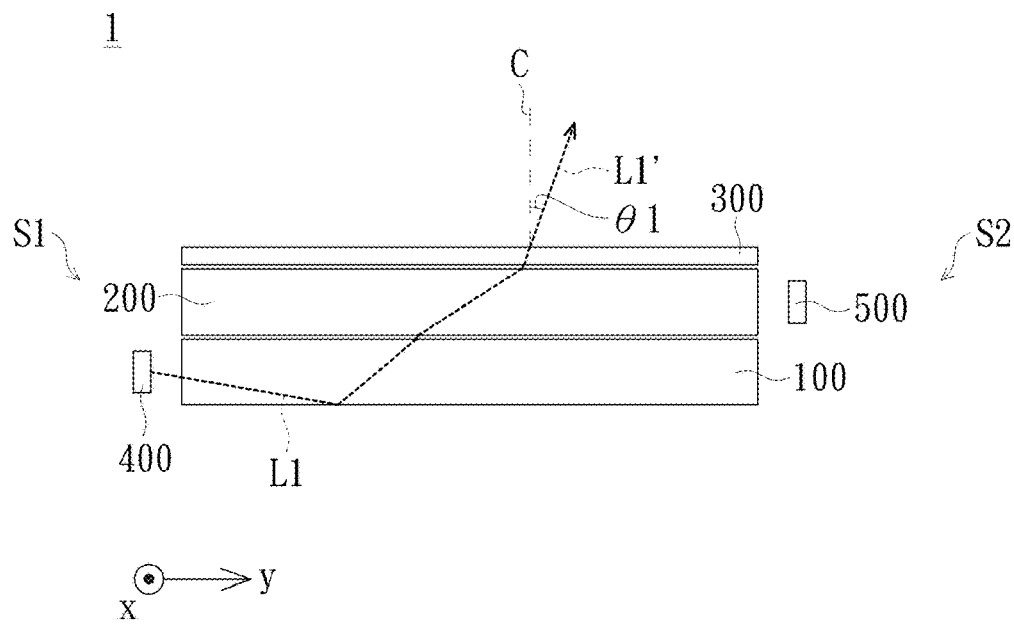
FIG. 5 is a schematic view of light path according to the embodiment in FIG. 1.

The prismatic structure 350 includes a first facet 351 and a second facet 352, and the first facet 351 intersect the second facet 352 to form a vertex angle B. In the embodiment of the present invention, the vertex angle B is between 60° and 80°, for example, can be 60°, 65°, 70°, 75°, or 80°, but not limited thereto. In addition, in some embodiments, the prismatic structure 350 is, for example, an isosceles triangular prism, but not limited thereto. When the first light source module 400 is turned on, as shown in FIG. 5, the first light ray L1 is emitted from the first light exiting surface 103, passes through the second light guide plate 200, and then enters the prismatic structure 350 of the reverse prism sheet 300, and thus an light output L1' is emitted from the side of the substrate 310. At this time, the light output L1' is preferably deflected toward the second side S2 and can have a light output angle θ1 relative to the normal C of the reverse prism sheet 300. In other words, the prismatic structure 350 can cooperate with the first light guide plate 100 and its first light guide structure 150 and have the effect of adjusting the angle and the direction of the first light ray L1, so that the light output L1' has the angle θ1 and is deflected toward the second side S2. The light output angle θ1 can be within a range, for example, from 0.5° to 20°, such as 0.5°, 1°, 2°, 3°, 4°, 5°, 6°, 7°, 8°, 9°, 10°, 11°, 12°, 13°, 14°, 15°, 16°, 17°, 18°, 19°, or 20°, but is not limited thereto. In some embodiments of the present invention, the light output angle θ1 can also be a specific angle. When the light output angle θ1 is the specific angle, the light output L1' preferably has the strongest light energy, the greatest light amount, or the greatest brightness at the angle θ1.

Figure 6:
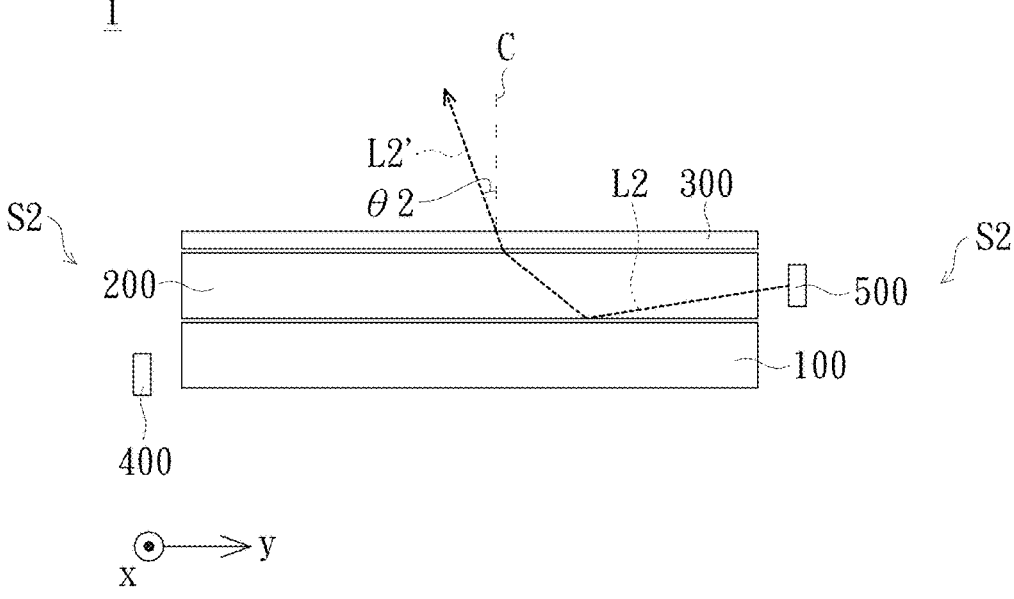
FIG. 6 is another schematic view of light path according to the embodiment in FIG. 1.

When the second light source module 500 is turned on, as shown in FIG. 6, the second light ray L2 enters the prismatic structure 350 of the reverse prism sheet 300 after being emitted from the second light exiting surface 204, and further exits from the side of the substrate 310 as an light output L2'. The light output L2' is preferably deflected toward the first side S1 and can have a light output angle θ2 relative to the normal C. In other words, the prismatic structure 350 can cooperate with the aforementioned second light guide plate 200 and its second light guide structure 250 and have the effect of adjusting the angle and the direction of the second light ray L2, so that the light output L2' has the angle θ2 and is deflected toward the first side S1. The light output angle θ2 can be within a range, for example, from 0.5° to 20°, such as 0.5°, 1°, 2°, 3°, 4°, 5°, 6°, 7°, 8°, 9°, 10°, 11°, 12°, 13°, 14°, 15°, 16°, 17°, 18°, 19°, 20°, but not limited thereto. In some embodiments of the present invention, the light output angle θ2 can also be a specific angle. When the light output angle θ2 is the specific angle, preferably, the light output L2' can have the strongest light energy, the greatest light amount, or the greatest brightness at the angle θ2.

Figure 7:
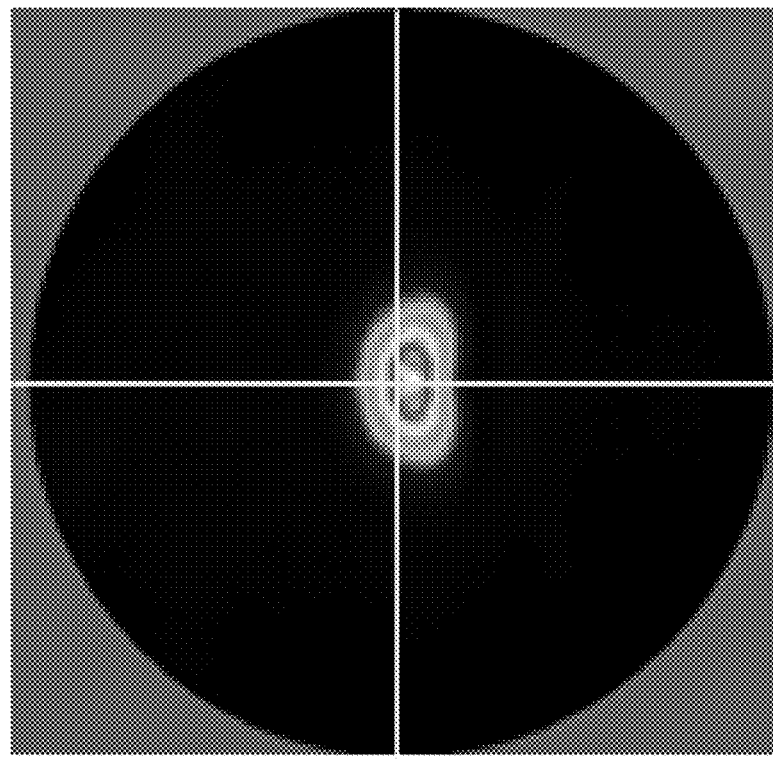
FIG. 7 is a light field distribution diagram of the embodiment in FIG. 5.
Figure 8:
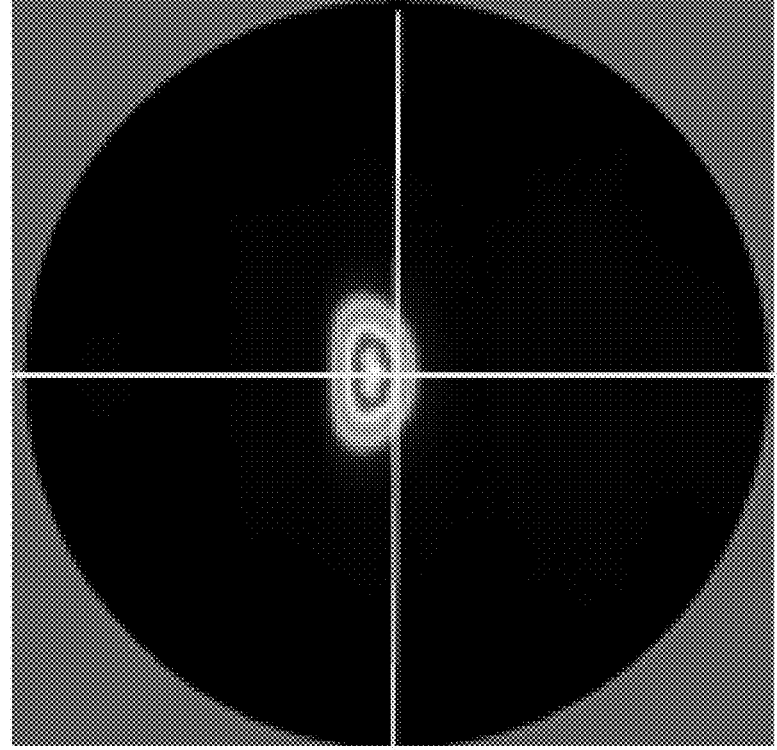
FIG. 8 is a light field distribution diagram of the embodiment in FIG. 6.

FIG. 7 is a light field distribution diagram of the embodiment shown in FIG. 5. As shown in FIG. 7, the light field distribution is slightly composed of concentric circles or concentric ellipses. The center of the circle/ellipses is represented by white, the circles adjacent to the center are colored red (darker grey) and orange (grey), and the outermost circle/ellipse is represented by blue (lighter grey). The white color represents the highest light energy or light quantity, and the light energy/light quantity gradually decreases outward. The intersection of the vertical and horizontal lines in FIG. 7 is the center of the screen. As shown in FIG. 7, the light field is not distributed in the center of the screen but slightly shifted to the right (i.e. the second side S2 of the backlight module 1) and also reflects the above-described light output L' which is deflected to the second side S2. In the embodiment of the present invention, the light output L1' is preferably directional emission. FIG. 8 is a light field distribution diagram of the embodiment shown in FIG. 6. The light field shown in FIG. 8 is not distributed in the center of the screen. Different from FIG. 7, the light field is slightly shifted to the left. That is, the light output L2' has the strongest light energy/light amount on the first side S1 and deviating from the direction of the normal C. In the embodiment of the present invention, the light output L2' is preferably directional emission.

Figure 9:
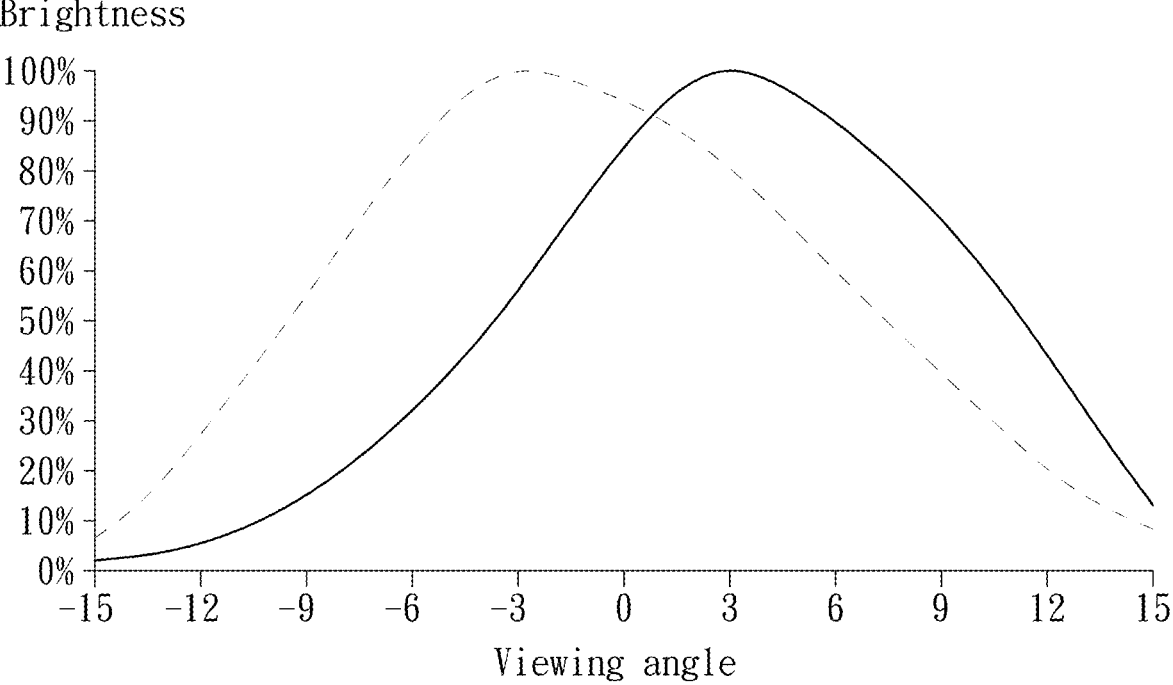
FIG. 9 is a relation diagram between horizontal viewing angle and brightness of the backlight module according to an embodiment of the present invention.

FIG. 9 is a diagram showing the relationship between the horizontal viewing angle and the brightness of the embodiment shown in FIG. 5 and FIG. 6, in which the dotted line and the solid line respectively represent the relationship between the viewing angle and the brightness of the light output L1' and the light output L2' in the horizontal direction when the first light source module 400 and the second light source module 500 are turned on. It should be noted that in FIG. 9, the negative direction (−) and the positive direction (+) can represent the opposite deflections of the light output L1' and light output L2'. However, the negative direction does not necessarily represent the left side, and the positive direction does not necessarily represent the right side. FIG. 9 only shows the relationship between the viewing angle and the brightness of the light output L1' from one side and the light output L2' from the opposite side. As shown by the dotted line, the light output L1' has the greatest brightness at a viewing angle of about −3°, and the light output L2' shown by the solid line has the greatest brightness at a viewing angle of about 3°. However, in the embodiment of the present invention, the greatest brightness is not limited to occurring at the viewing angle of −3° or 3°. For example, the greatest brightness can occur in the viewing angle ranged approximately from −0.5° to −1° and from 0.5° to 1°, or approximately from −2° to −5° and from 2° to 5°, or approximately from −5° to −20° and from 5° to 20°. The range of the viewing angle of the greatest brightness can vary based on, but is not limited to, for example, the value of the first included angle A1, the value of the second included angle A2, and the value of the vertex angle B. Because the greatest brightness can occur in different viewing angle ranges, the backlight module 1 in the embodiments of the present invention can be applied to various display devices (as will be described later).

Figure 10:
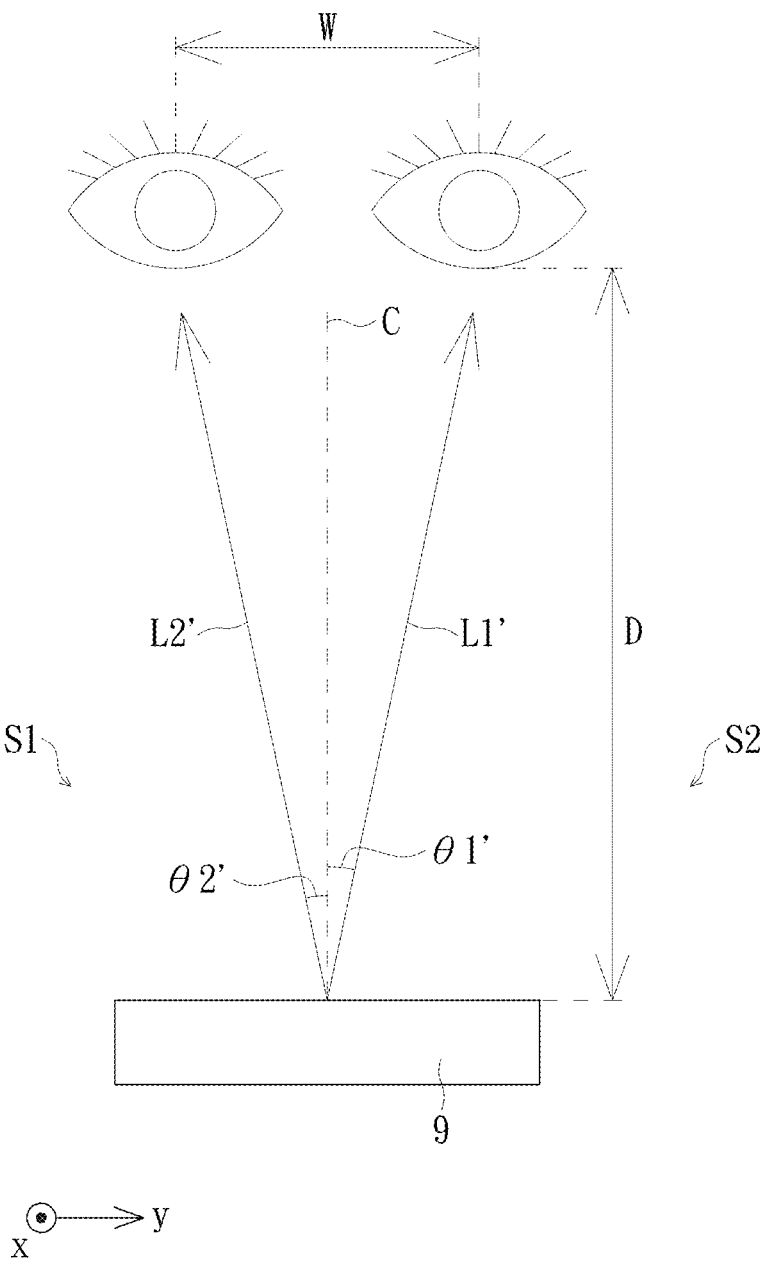
FIG. 10 is a schematic diagram of the relationship between a display device and a viewer according to an embodiment of the present invention.
Figure 11:
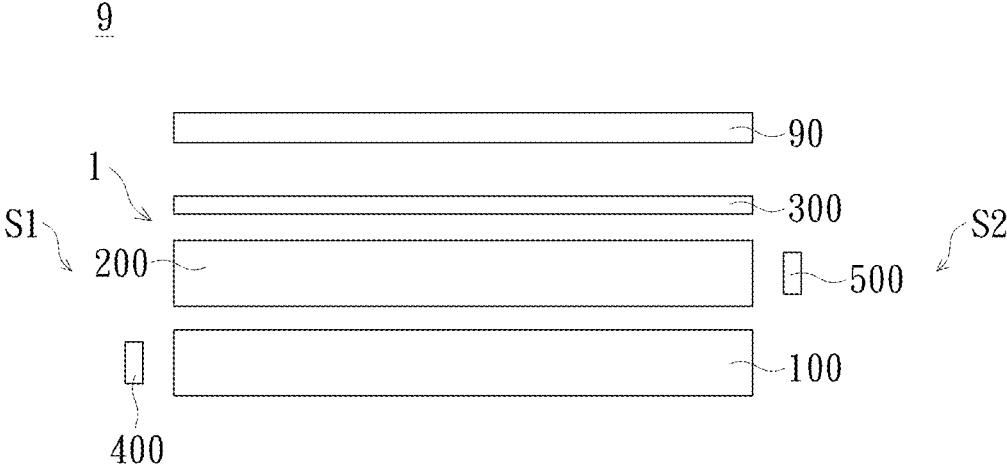
FIG. 11 is a three-dimensional schematic view of a display device according to an embodiment of the present invention.
Figure 11:
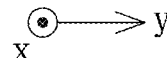

As shown in FIG. 10, when the backlight module 1 is used in a display device 9 (such as a liquid crystal display) and a display module (such as a display panel) is disposed thereon, the light outputs L1' and L2' are respectively deflected toward the second side S2 and first side S1, and the display device 9 therefore can respectively generate an image of the viewing angle θ1' and an image of the viewing angle θ2'. The viewing angle θ1' and the viewing angle θ2' can respectively correspond to the aforementioned light output angle θ1 and light output angle θ2. When the viewer watches the display surface, the image of the viewing angle θ1' can enter one eye, such as the left eye, alternatively, the image of the viewing angle θ2' can enter the other eye, such as the right eye. When the first light source module 400 and the second light source module 500 are turned on alternately, the left and right eyes receive the images in turn. It can be known that, depending on the position of the viewer, the image of the viewing angle θ1' can enter the right eye, and the image of the viewing angle θ2' can enter the left eye, for example, when the viewer's back is turned to the readers us (the viewer's eyes cannot be seen at this time, and the viewer's back will be shown in the figure). A stereoscopic vision can be generated when the frequency at which the left and right eyes receives the images in turn is greater than a specific frequency, preferably greater than the frequency of visual persistence. In the embodiment of the present invention, the frequency at which the first light source module 400 and the second light source module 500 are turned on alternately is roughly equal to (or even equal to) the frequency at which the left and right eyes take turns to receive images. The frequency can be, for example, greater than 60 frames per eye per second, that is, each light source module is turned on/off more than 60 times per second, and the two light source modules are alternately turned on more than 60 times per second. At this time, the total times that the first light source module 400 and the second light source module 500 are turned on per second can be greater than 120 times. The image entering the left eye and the image entering the right eye can be the same, but not limited thereto. The images that alternately enter the left and right eyes can be designed according to the stereoscopic visual effect to be generated, and the present invention does not limit this.

As described above, the display device 9 using the backlight module 1 can alternately generate the image of the viewing angle θ1' and the image of the viewing angle θ2'. In the embodiment of the present invention, the viewing angle θ1' can be, for example, ranged from −0.5° to −20° (the negative direction represents the deflection toward the second side S2), and the viewing angle θ2' can be, for example, ranged from 0.5° to 20° (the positive direction represents the deflection toward the first side S1). Further, in some embodiments, the viewing angle of θ1' can further be, for example, ranged between −0.5° and −1°, and the viewing angle θ2' can be, for example, ranged between 0.5° and 1°; or, the viewing angle θ1' can be, for example, ranged between −2° and −5°, and the viewing angle θ2' is, for example, ranged between 2° and 5°; or, the viewing angle θ1' is, for example, ranged between −5° and −20°, and the viewing angle θ2' is, for example, ranged between 5° and 20°. When the viewing angle θ1' is, for example, ranged between −2° and −5° and the viewing angle θ2' is, for example, ranged between 2° and 5°, the greatest brightness of the backlight module 1 can occur at the viewing angle(s) approximately ranged between −2° and −5° and between 2° and 5°, but is not limited thereto.

In the embodiment of the present invention, for example, when the display device 9 is a computer such as a notebook computer, it can alternately generate an image of the viewing angle θ1' ranged approximately between −2° and −5° and an image of the viewing angle θ2' ranged approximately between 2° and 5°. In some embodiments of the present invention, a notebook computer having the backlight module 1 can further alternately generate an image of the viewing angle θ1' of −3° and an image of the viewing angle θ2' of 3°. When the display device 9 is a larger display device such as a television or a commercial sign, it can alternately generate an images of the viewing angle θ1' ranged approximately between −0.5° and −1° and an image of the viewing angle θ2' ranged approximately between 0.5° and 1°. When the display device 9 is a handheld electronic product such as a mobile phone or a tablet, it can generate an image of the viewing angle θ1' ranged approximately between −5° and −20° and an image of a viewing angle θ2' ranged approximately between 5° and 20°. As shown in FIG. 10, generally speaking, the distance W between human's two eyes is approximately 5.5 to 7 centimeters, and the distance D between the eyes and the display device 9 can be various, for example, it can be as close as 15 centimeters from a handheld electronic product or smaller to the eyes, or within 100 centimeters from a notebook computer to the eyes, and from one to several meters from a TV to the eyes. According, the light output range of the backlight module 1 and the image viewing angle of the display device 9 can be designed in accordance with the distance W and the distance D, so that the left and right eyes can accurately receive the image of the negative direction and the image of the positive direction respectively, thereby generating a stereoscopic vision.

The present invention also provides a display device 9. The display device 9 can further be a naked-eye stereoscopic display device, comprising the backlight module 1 and the display panel 90 as described above, and the display panel 90 is disposed on the backlight module 1. The naked-eye stereoscopic display device can cause images of specific viewing angles to enter the left and right eyes respectively in the manner described above, thereby generating stereoscopic vision. The naked-eye stereoscopic display device can be, for example, a mobile phone, a tablet, a computer, or a digital signage, but not limited thereto. The backlight module 1 of the embodiment of the present invention can alternately provide directional light emission on the left and right sides of the normal line, thereby is beneficial for the image entering the two eyes respectively to effectively generate stereoscopic vision. Since the backlight module 1 of the embodiment of the present invention is by means of at least two pairs of the light guide plates and light source modules, i.e., the first light guide plate 100 cooperating with the first light source module 400 and the second light guide plate 200 cooperating with the second light source module, the light brightness and image brightness can therefore be endured.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module, comprising:
a light guide plate assembly, comprising:
a first light guide plate, having a first light incident surface, a first light exiting surface, a first bottom surface, and a plurality of first light guide structures, wherein the first light exiting surface and the first bottom surface are respectively located on opposite sides of the first light guide plate and connected to the first light incident surface, and the plurality of first light guide structures are formed on the first bottom surface; wherein the first light guide structure has a first bevel forming a first included angle with respect to the first bottom surface, the first included angle of the first light guide structure is greater than or equal to 1° and less than or equal to 6°, and is away from the first incident surface; and
a second light guide plate, disposed on the first light guide plate and having a second light incident surface, a second light exiting surface, a second bottom surface, and a plurality of second light guide structures, wherein the second light exiting surface and the second bottom surface are respectively located on opposite sides of the second light guide plate and connected to the second light incident surface, the second bottom surface faces the first light exiting surface of the first light guide plate, and the plurality of second light guide structures are formed on the second bottom surface; wherein the second light guide structure has a first bevel forming a first included angle with respect to the second bottom surface, the first included angle of the second light guide structure is greater than or equal to 1° and less than or equal to 6°, and is away from the second incident surface;
a reverse prism sheet, disposed on the second light guide plate and comprising a substrate and a plurality of prismatic structures, wherein the plurality of prismatic structures are disposed on the substrate, extend along a first direction, and face the second light exiting surface of the second light guide plate; wherein each of the prismatic structures has a first facet and a second facet, the first facet and the second facet intersect to form a vertex angle, and the vertex angle is 60°-80°; and
a first light source module and a second light source module adapted to be activated alternatively at a frequency, wherein:
the first light source module is disposed aside the first incident surface, and is adapted to be activated and provide a first light ray; the first light ray passes through the first light guide plate, the second light guide plate, and the reverse prism sheet and is emitted;
the second light source module is disposed aside the second incident surface, and is adapted to be activated and provide a second light ray; the second light ray passes through the second light guide plate and the reverse prism sheet, and is emitted; wherein an output angle of the first light ray from the reverse prism sheet and an output angle of the second light ray from the reverse prism sheet are respectively between 0.5° and 20°.

2. The backlight module according to claim 1, wherein the first light guide structure and the second light guide structure extend along a first direction, and the first direction is parallel to an extension direction of the first incident surface.

3. The backlight module according to claim 1, wherein the prismatic structure is an isosceles triangular prism.

4. The backlight module according to claim 1, wherein an activation frequency of the first light source module and an activation frequency of the second light source module each are greater than 60 times per second, and the first light source module and the second light source module are activated alternatively at the frequency of greater than 60 times per second.

5. The backlight module of claim 4, wherein a sum of activations of the first light source module and the second light source module per second is greater than 120.

6. The backlight module of claim 1, wherein the output of the first light ray from the reverse prism is further deflected from the normal line of the reverse prism sheet to a second side, wherein the second side is located at the first incident surface side, and the output of the second light ray from the reverse prism is further deflected from the normal line of the reverse prism sheet to a first side opposite to the second side.

7. A naked-eye stereoscopic display device, comprising:
a backlight module, including:
    a light guide plate assembly, comprising:
        a first light guide plate, having a first light incident surface, a first light exiting surface, a first bottom surface, and a plurality of first light guide structures, wherein the first light exiting surface and the first bottom surface are respectively located on opposite sides of the first light guide plate and connected to the first light incident surface, and the plurality of first light guide structures are formed on the first bottom surface; wherein the first light guide structure has a first bevel forming a first included angle with respect to the first bottom surface, the first included angle of the first light guide structure is greater than or equal to 1° and less than or equal to 6°, and is away from the first incident surface; and
        a second light guide plate, disposed on the first light guide plate and having a second light incident surface, a second light exiting surface, a second bottom surface, and a plurality of second light guide structures, wherein the second light exiting surface and the second bottom surface are respectively located on opposite sides of the second light guide plate and connected to the second light incident surface, the second bottom surface faces the first light exiting surface of the first light guide plate, and the plurality of second light guide structures are formed on the second bottom surface; wherein the second light guide structure has a first bevel forming a first included angle with respect to the second bottom surface, the first included angle of the second light guide structure is greater than or equal to 1° and less than or equal to 6°, and is away from the second incident surface;
a reverse prism sheet, disposed on the second light guide plate and comprising a substrate and a plurality of prismatic structures, wherein the plurality of prismatic structures are disposed on the substrate, extend along a first direction, and face the second light exiting surface of the second light guide plate; wherein each of the prismatic structures has a first facet and a second facet, the first facet and the second facet intersect to form a vertex angle, and the vertex angle is 60°-80°; and
a first light source module and a second light source module adapted to be activated alternatively at a frequency, wherein:
the second incident surface of the second light guide plate is located on the second side, the first light source module is disposed aside the first incident surface, and is adapted to be activated and provide a first light ray; the first light ray passes through the first light guide plate, the second light guide plate, and the reverse prism sheet and is emitted;
the second light source module is disposed aside the second incident surface, and is adapted to be activated and provide a second light ray; the second light ray passes through the second light guide plate and the reverse prism sheet, and is emitted; wherein an output angle of the first light ray from the reverse prism sheet and an output angle of the second light ray from the reverse prism sheet are respectively between 0.5° and 20° and the first light source module and the second light source module are adapted to be activated alternatively at a frequency; and
a display panel, disposed on the backlight module.

* * * * *